US008368960B2

(12) United States Patent
Hori

(10) Patent No.: US 8,368,960 B2
(45) Date of Patent: Feb. 5, 2013

(54) IMAGE PROCESSING APPARATUS, COMPUTER READABLE MEDIUM, AND PRINTING APPARATUS

(75) Inventor: Motofumi Hori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 833 days.

(21) Appl. No.: 12/536,990

(22) Filed: Aug. 6, 2009

(65) Prior Publication Data

US 2010/0245925 A1   Sep. 30, 2010

(30) Foreign Application Priority Data

Mar. 26, 2009   (JP) ................................ 2009-076027

(51) Int. Cl.
*H04N 1/405* (2006.01)
*G06F 3/12* (2006.01)
*G06K 15/00* (2006.01)

(52) U.S. Cl. ........ 358/3.06; 358/1.9; 358/1.15; 358/2.1; 358/3.13

(58) Field of Classification Search .................. 358/3.06, 358/1.9, 1.15, 2.1, 3.13
See application file for complete search history.

(56) References Cited

U.S. PATENT DOCUMENTS

| 6,674,546 B1 * | 1/2004 | Nakahara .................. 358/1.9 |
| 2009/0174897 A1 * | 7/2009 | Sato ....................... 358/1.15 |

FOREIGN PATENT DOCUMENTS

| JP | A-1-171365 | 7/1989 |
| JP | A-08-305522 | 11/1996 |
| JP | A-2001-229002 | 8/2001 |
| JP | B2-3829908 | 10/2006 |
| JP | B2-3974721 | 9/2007 |
| JP | A-2008-060730 | 3/2008 |

OTHER PUBLICATIONS

Yabuta, Whole Picture of Adobe Photoshop 7.0 Highlighting Three New Functions, ASCII Corporation, 2002, vol. 26, No. 6, pp. 246-249.
Kawamura, Adobe Photoshop 7.0 compatible with Mac OS X Appeared, MAC Power Japan, ASCII Corporation, 2002, vol. 13, No. 4, p. 88-89.
Yoshida et al., Adobe Photoshop 7.0 Basics & Tips, Mac Fan Special 24, Mainichi Communications Inc., 2002, p. 169.
Japanese Office Action in Japanese Patent Application No. 2009-076027; dated Nov. 30, 2010 (with English-language translation).

* cited by examiner

*Primary Examiner* — Charlotte M Baker
(74) *Attorney, Agent, or Firm* — Oliff & Berridge, PLC

(57) ABSTRACT

An image processing apparatus is provided, the image processing apparatus including: an interpreting section that interprets instructions of a print control contained in print information, the instructions including a resolution instruction, a monochrome designation instruction indicating whether a monochrome designation is applied, and a page description language designation instruction; a selecting section that selects a binary-processing threshold matrix in response to at least the resolution instruction, the monochrome designation instruction, and the page description language designation instruction by any of ways including selecting and eliminating; and a binary-processing section that binary-processes a page description language contained in the print information by employing the binary-processing threshold matrix selected by the selecting section.

9 Claims, 7 Drawing Sheets

IMAGE PROCESSING APPARATUS, COMPUTER READABLE MEDIUM, AND PRINTING APPARATUS

CROSS-REFERENCE TO RELATED APPLICATIONS

This application is based on and claims priority under 35 U.S.C. 119 from Japanese Patent Application No. 2009-076027 filed Mar. 26, 2009.

BACKGROUND

1. Technical Field

The present invention is related to an image processing apparatus, a computer readable medium and a printing apparatus.

2. Related Art

Screens employed in half-tone processing operations (namely, binary processing operations) have been inherently defined with respect to printers, or process modes of jobs. In the half-tone processing operations, multi-valued image data are converted into two-valued image data. Concretely speaking, while screens have been previously prepared every monochrome, each plane ("K(black)", "Y(yellow)", "M(magenta)", and "C(cyan)"), and also, every sort of drawing objects (text, graphics, image), these prepared screens are processed.

SUMMARY

According to an aspect of the present invention, there is provided an image processing apparatus including: an interpreting section that interprets instructions of a print control contained in print information, the instructions including a resolution instruction, a monochrome designation instruction indicating whether a monochrome designation is applied, and a page description language designation instruction; a selecting section that selects a binary-processing threshold matrix in response to at least the resolution instruction, the monochrome designation instruction, and the page description language designation instruction by any of ways including selecting and eliminating; and a binary-processing section that binary-processes a page description language contained in the print information by employing the binary-processing threshold matrix selected by the selecting section.

BRIEF DESCRIPTION OF THE DRAWINGS

Exemplary embodiment of the present invention will be described in detail based on the following figures, wherein.

DETAILED DESCRIPTION

A description is made of modes (will be referred to as "exemplary embodiment modes" hereinafter) for carrying out the present invention. The exemplary embodiment modes will be described in the below-mentioned sequence:
1. First exemplary embodiment mode
2. Second exemplary embodiment mode
3. Image processing program
4. Printing apparatus

1. First Exemplary Embodiment Mode (Arrangement of Image Processing Apparatus Related to First Exemplary Embodiment Mode)

Figure 1:
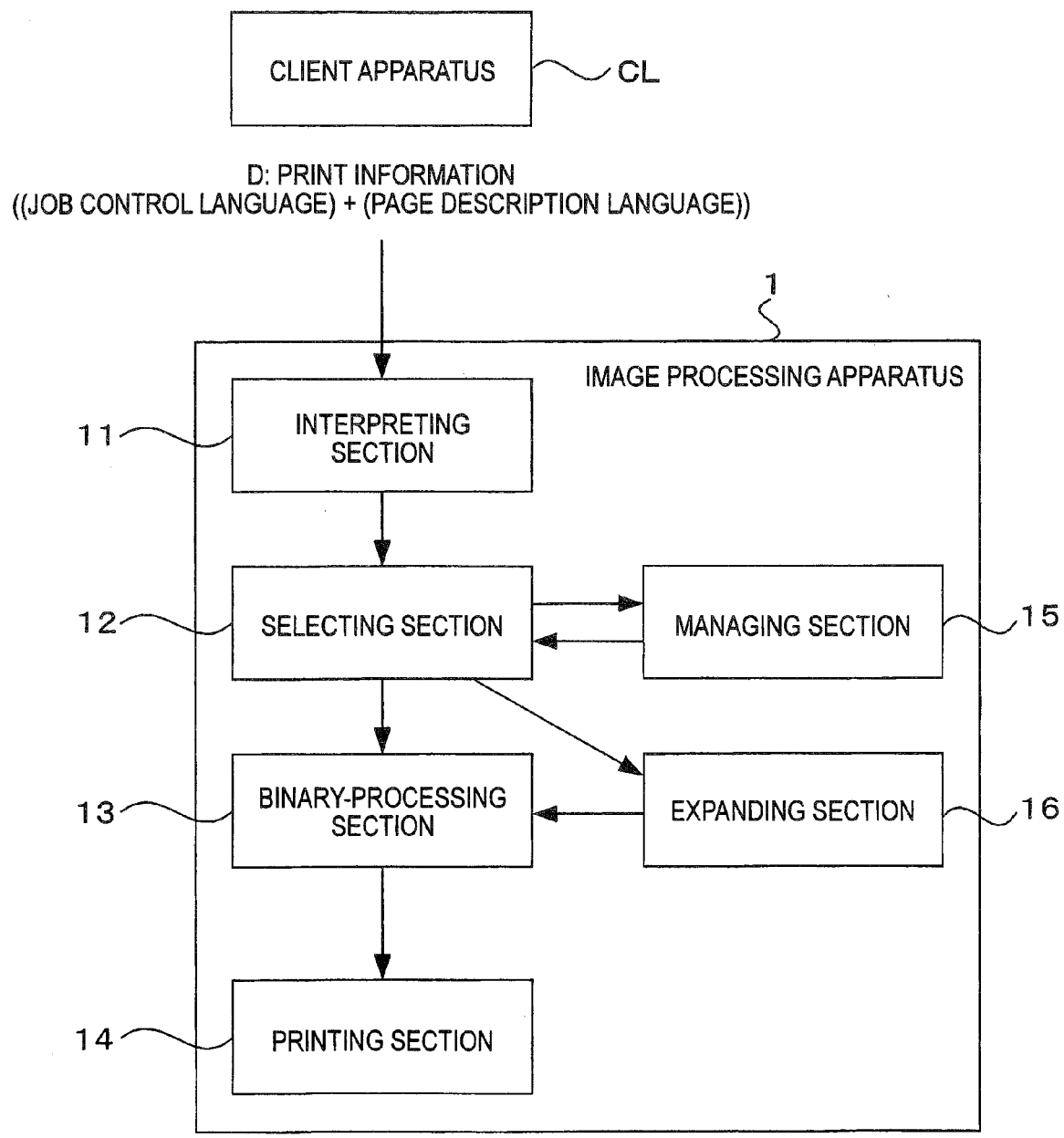
FIG. 1 is a block diagram for describing an arrangement of an image processing apparatus according to a first embodiment mode of the present invention.

FIG. 1 is a block diagram for describing an arrangement of an image processing apparatus 1 according to a first exemplary embodiment mode of the present invention. The image processing apparatus 1 related to the first exemplary embodiment mode receives print information "D" from, for instance, a personal computer corresponding to a client apparatus "CL", and then outputs print data to a medium. The image processing apparatus 1 is arranged in, for instance, a printing apparatus such as a printer, a multi-function apparatus, and the like.

The image processing apparatus 1 related to the first exemplary embodiment mode is equipped with interpreting section 11, selecting section 12, binary-processing section 13, managing section 15, and expanding section 16. Also, in addition to the above-described structural arrangements, printing section 14 is provided, so that the image processing apparatus 1 may constitute a printing apparatus.

The interpreting section 11 executes a process operation for interpreting a job control command which corresponds to a print control instruction from the print information "D" transmitted from the client apparatus "CL." In this case, a description is made of a structure as to the print information "D." The print information "D" is such an information that a job control language has been added to a page description language.

Figure 2A:
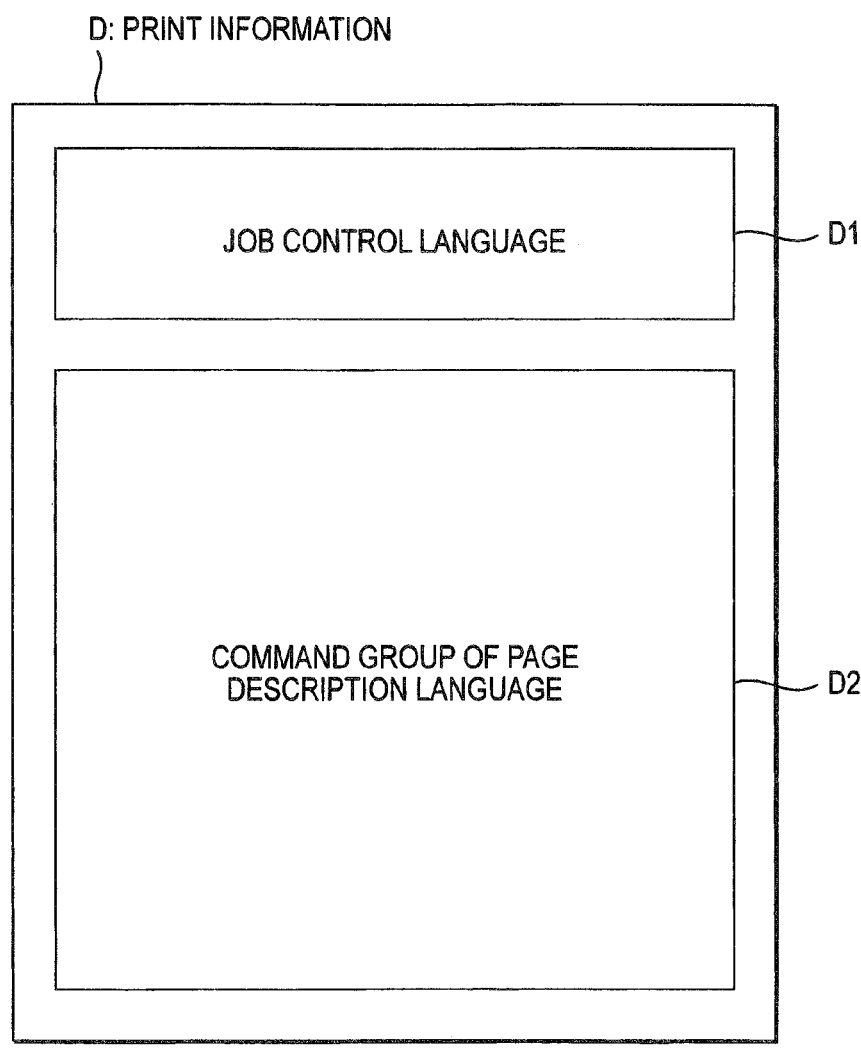
FIGS. 2A and 2B are schematic diagrams for explaining a structure of print information.
Figure 2B:
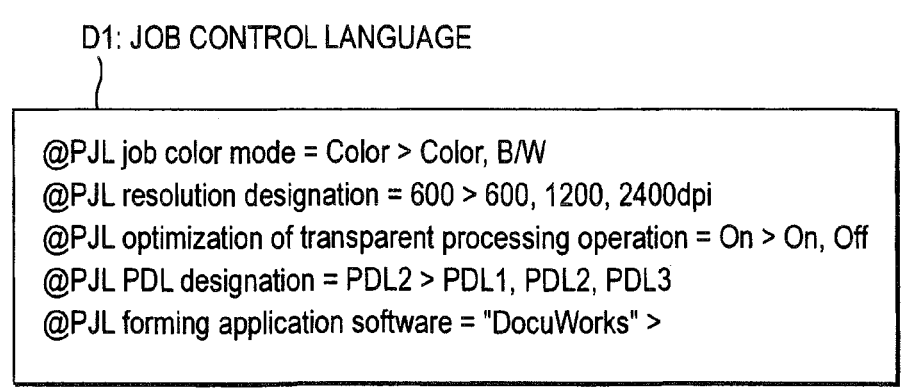

FIGS. 2A and 2B are schematic diagrams for describing a structure of the print information "D." The print information "D" corresponds to a combination of plural pieces of information which are required in order to be printed by the image processing apparatus 1. As represented in FIG. 2A, the print information "D" is constituted by employing a job control language "D1" and a page description language "D2." The page description language "D2" corresponds to a group of instructions (commands) which represent respective elements such as characters, figures, and photographs, which should be printed (namely, instruction group).

The job control language "D1" corresponds to such a language into which setting information for a printing operation has been written when the printing operation is carried out based upon an instruction of the page description language "D2." FIG. 2B is a diagram for indicating one example of the job control language "D1." The job control language "D1" is designated based upon [@ PJL]. The job control language "D1" constructs instructions (commands) for designating, for instance, "job color mode", "resolution designation", "optimization for transparent processing operation", "PDL designation", and "forming application software".

In the above-described "job color mode", either a color mode or a black/white mode is designated. In the above-explained "resolution designation", various sorts of resolution with respect to printing process operations are designated based upon "dpi (dot per inch)". In the above-described "optimization for transparent processing operation", when a transparent processing operation is carried out, a designation is made whether or not an optimizing process operation is carried out, namely, when the optimizing process operation is performed, "ON" is designated, whereas when the optimizing process operation is not performed, "OFF" is designated. The above-described transparent processing operation implies such a processing operation that an upper image element is overlapped with a lower image element in predetermined transmissivity. In the above-described "PDL designation", a sort of a page description language is designated. In the above-explained "forming application software", a designation is made of such a sort of application software by which information to be printed has been formed.

The interpreting section 11 shown in FIG. 1 extracts the above-described job control language from the print information "D" transmitted from the client apparatus "CL" so as to interpret that which designation has been made.

The selecting section 12 performs a processing operation for either selecting or eliminating a binary-processing screen in response to interpreted results of at least the instructions of "resolution designation", "job color mode", and "PDL designation" among instructions of the job control language (job control commands) interpreted by the interpreting section 11. In the case that "optimization for transparent processing operation" and "forming application software" are contained in the instructions of the job control language (job control commands) interpreted by the interpreting section 11, the screen selecting section 12 selects, or eliminates the binary-process screen by additionally employing these interpreted results.

In this case, the binary-processing screen corresponds to such a threshold matrix which is employed in a half-tone processing operation (binary-processing operation) which converts multi-valued image data into image data having a binary value. Plural sorts of screens have been previously stored in the managing section 15. These screens have been prepared for each of attributes and each of parameters, which are set by a job control command, and have been previously stored in the managing section 15.

As the above-described attributes, "resolution", "color modes", "sorts of PDL", and "optimization for transparent process operations" are listed up. As the above-explained parameters, the below-mentioned items are designated. That is, in the case of the resolution, for example, a numeral value such as 600 dpi and 1200 dpi is designated. In the case of the color mode, either a color processing operation or a black/white processing operation is designated. In the case of the PDL sort, a sort name of PDL is designated. In the case of the optimization for the transparent processing operation, a designation is made whether or not the transparent processing operation is optimized. The screens have been prepared with respect to each of these attributes and parameters.

In response to a job control command interpreted by the interpreting section 11, the selecting section 12 selectively cuts and divides these screens into a screen which is used, and another screen which is not used. The screen which is determined to be used by the above-described cut/dividing process (otherwise, screen except for eliminated screens) is expanded by the expanding section 16.

The binary-processing section 13 executes such a processing operation for binary-processing a page description language contained in the print information "D" by employing either the screen selected by the selecting section 12 or such a screen which has not been eliminated to be left by the selecting section 12. In other words, either the screen selected by the selecting section 12 or the screen which has not been eliminated to be left by this selecting section 12 is expanded into a memory by the expanding section 16. The binary-processing section 13 performs a binary-processing operation (will be referred to as "screen processing operation" hereinafter) with respect to image data expanded from the page description language of the print information "D" by employing the screen expanded to the memory by the expanding section 16.

The printing section 14 performs such a printing process operation that the image data screen-processed (binary-processed) by the binary-processing section 13 is printed on a printing medium such as paper.

The managing section 15 stores thereinto screens which are prepared with respect to each of the attributes and each of the parameters, and manages the stored screens, while these attribute and parameter are set based upon the job control command. The expanding section 16 executes such a processing operation that either the screen selected by the selecting section 12 or the screen which has not been eliminated to be left by the selecting section 12 is expanded on a RAM (Random Access Memory) in order that the above-described screens may be read out from such a storage section as a ROM (Read-Only Memory).

(Concrete Example of Image Processing Apparatus)

Figure 3:
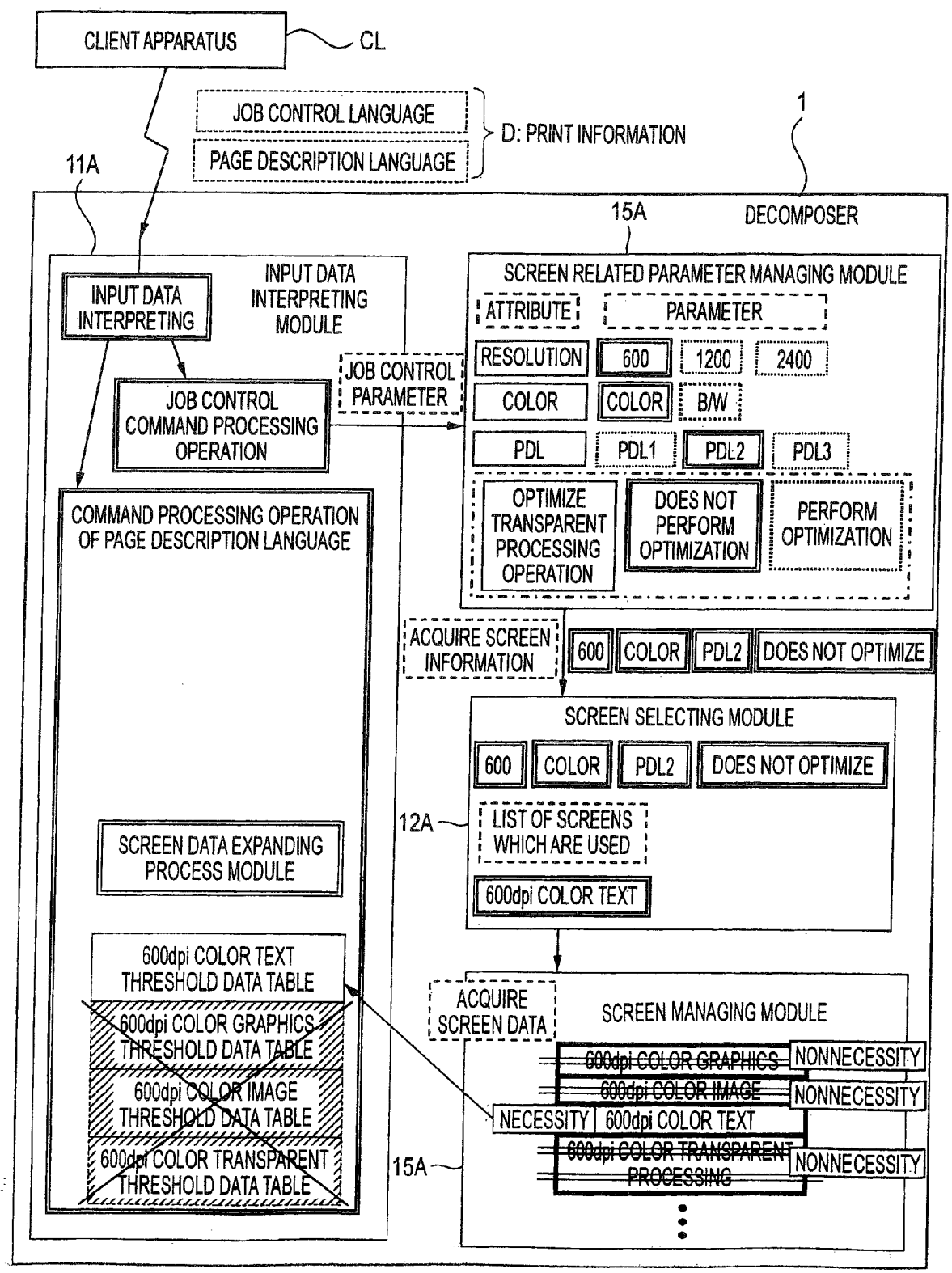
FIG. 3 is a block diagram for describing a concrete example as to the image processing apparatus.

FIG. 3 is a block diagram for describing a concrete example as to the image processing apparatus. The image processing apparatus 1 has been realized as a decomposer which is provided in, for instance, a printing apparatus, or a multi-function processing apparatus. In this concrete example, the decomposer corresponds to the below-mentioned structural unit constructed by utilizing hardware and software, which interprets the print information "D" transmitted from a client apparatus (for example, personal computer) "CL" so as to convert the print information "D" into image data having a bitmap format which is employed when the image data is printed out.

The decomposer is equipped with an input data interpreting module 11A, a screen parameter managing module 15A, and a screen selecting module 12A. Among these arrangements, the input data interpreting module 11A corresponds to the interpreting section 11 shown in FIG. 1; the screen parameter managing module 15A corresponds to the managing section 15 shown in FIG. 1; and the screen selecting module 12A corresponds to the selecting section 12 indicated in FIG. 1.

The input data interpreting module 11A performs a processing operation for interpreting the print information "D" transmitted from the client apparatus "CL", another processing operation for interpreting a job control language, and a further processing operation for interpreting a page description language. In the processing operation for interpreting the job control language, each of the attributes and each of the parameters, which are designated by the job control command, are interpreted, and then, the interpreted attribute and parameter are transmitted to the screen parameter managing module 15A.

In the processing operation for interpreting the page description language, the page description language is extracted from the print information "D"; a command is interpreted so as to be expanded to bit map data which is employed when a printing process operation is carried out; and a binary process operation is carried out by employing a selected screen (will be explained later).

The screen parameter managing module 15A has managed both the respective attributes and the respective parameters of the job control command. In other words, the screen parameter managing module 15A manages that which attribute and which parameter have been employed in response to an interpreted result of the job control command transmitted from the input data interpreting module 11A.

The screen selecting module 12A executes such a processing operation that both an attribute and a parameter are acquired as screen information, which have been managed by the screen parameter managing module 15A, so as to select a screen which is to be used. The selected screen is utilized in a screen data expanding process operation which is performed in the input data interpreting model 11A. In the processing operation of the page description language, a binary process operation is carried out by employing the expanded screen (namely selected screen).

Comparison Example

Prior to a description made of a screen processing operation executed by the image processing apparatus 1 according to the present exemplary embodiment mode, a screen processing operation executed in a comparison example will now be explained.

Firstly, when an image processing apparatus (for instance, printer) receives print information from a client apparatus (for instance, personal computer), the image processing apparatus interprets attribute information which is designated by a job control language added to a head of the received print information.

In the comparison example, the image processing apparatus interprets both resolution and a color mode contained in the above-interpreted attribute information. For instance, the below-mentioned 4 sorts of screens are conceivable which may be possibly used in such a job that a color processing operation with resolution of 600 dpi has been designated:

(1) 600 dpi, color font processing-purpose screen.
(2) 600 dpi, color text processing-purpose screen.
(3) 600 dpi, color graphics processing-purpose screen.
(4) 600 dpi, color transparent processing-purpose screen.

When the attribute and the parameter which are designated by this job control language are received by the image processing apparatus, a screen data expanding process module reads out 4 sets of the above-explained screen data from a storage section such as a ROM, and then, expands the read screen data on a RAM in order that these screen data may be used. Since a series of the above-described process operations has been performed, an initializing operation of the job based upon the job control language is accomplished.

Next, when a page description language of the print information is received, the image processing apparatus produces a drawing image, while switching these screens based upon a sort of this command (font process operation, text process operation, graphics process operation, transparent process operation, etc).

As previously described, in the comparison example, all of the screen data designated in the color processing operation with the resolution of 600 dpi have been previously read out from the RON and then have been expanded on the RAM. As a result, a lengthy time is necessarily required in the expanding process operation, and such a memory capacity capable of storing thereinto all of these screen data is necessarily required.

For instance, in such a case that a time period of 500 msec is required in the screen expanding process operation when the above-explained job initialization is carried out, there are some possibilities that a processing time required for 1 page is shorter than, or equal to 1 second (60 ppm) in such a printer having superior printing performance. If the initializing time for the above-explained screen expanding process operation takes 500 msec in such a system, then the resulting system requires a lengthy time for the initializing operation, as compared with the job processing time.

As an easily conceivable solving method, the following initializing operation may be considered: That is, assuming now that only such a screen which is utilized with a top priority is expanded when a job initializing operation is carried out, a initialization of the job is thereafter carried out, if necessary, in a half way while a drawing command is interpreted. However, as previously explained, in such a system that a processing time for 1 page is required to become shorter than, or equal to 1 second, if the initialization time of 500 msec for the screen expanding process operation is inserted in process operations for pages, then performance of the resulting system is deteriorated.

More specifically, unless a printing apparatus acquires a complete set of print data for 1 page and then transmits the acquired print data within a predetermined time, there are some possibilities that a page processing operation cannot be matched with the printing speed of the printing apparatus. If the page processing operation is not once matched with the printing speed of the printing apparatus, then a printing process unit (printer engine) of the printing apparatus is required to be stopped, or is required to be brought into an idling status, which necessarily requires a recovery time.

(Screen Processing Operation of First Exemplary Embodiment Mode)

Next, a description is made of a screen processing operation executed in the image processing apparatus according to the first exemplary embodiment mode.

The image processing apparatus 1 of the present exemplary embodiment mode has such a feature that a sort of such a binary-processing screen which is required in a print instruction (namely, job) transmitted from the client apparatus "CL" is delimited when the job initialization is carried out (namely, before page description language is interpreted).

In the image processing apparatus 1 of the present exemplary embodiment mode, a job control language contained in the print information "D" is interpreted so as to delimit a screen which is actually used based upon an attribute and a parameter. As to the attributes in addition to the resolution and the color modes defined in the above-explained comparison example, the following items are additionally employed, namely, a sort of a page description language, a designation of a transparent processing operation, and a sort of application software by which print information "D" has been formed.

In this case, as to the sort of the above-described page description language, such a screen which is used is selected, or eliminated, depending upon a sort of a designated page description language. For instance, in the case of such a page descriptions language which has only a text drawing command, the graphics processing-purpose screen and the image processing-purpose screen are no longer expanded.

As to a designation of a transparent processing operation, a screen which is used is selected, or eliminated by determining whether or not the transparent processing operation is carried out. For instance, a total number of these screens may be reduced in such a case that the transparent processing operation is not carried out, or even when the transparent processing operation is carried out, print data may be drawn by employing the normal screen.

As to a designation of a sort of application software, a screen which is used is selected, or eliminated, depending upon such a sort of application software by which the print information "D" has been formed. There are some possibilities that a subject to be drawn may be restricted, depending upon a certain sort of application software. For instance, in such a print information "D" formed by executing such a sort of application software that only a text is drawn based upon text editing software, screens other than the screen of the text are no longer required. Conversely, in such a print information "D" formed by executing such an application software in which a photograph data processing operation is carried out, screens other than the image processing-purpose screen are no longer required.

Generally speaking, as to a sort of a page description language, since a printer driver (printer driving software) is formed for a specific page description language, such a command for designating the page description language of the job control language is issued.

Also, a designation whether or not the transparent processing-purpose screen is used is made by executing the printer driver. That is, selection items for indicating that an optimization of the transparent processing operation is "performed" or "not performed" have been provided in setting items of the printer driver. In this example, such a designation that the optimization of the transparent processing operation is "not performed" corresponds to such a specification that even when a drawing designation command of the transparent processing operation is issued under page printing operation, the normal screen is used.

Further, when the application software by which the print information "D" has been formed is designated, while the image processing apparatus 1 is equipped with a table indicative of a corresponding relationship between the sorts of screens and the titles of the application software by which the above-described print information "D" has been formed, the below-mentioned restriction is made. That is, in the case of such an application software which is coincident with the content of this table, only such a screen defined in this table is restrictedly formed.

Referring now to FIG. 3, a description is made of one concrete example as to the screen processing operation executed in the image processing apparatus according to the first exemplary embodiment mode. The input data interpreting module 11A interprets a job control language contained in the print information "D" transmitted from the client apparatus "CL", and then, sends a parameter of a job control command to the screen parameter managing module 15A. In one concrete example shown in FIG. 3, the below-mentioned attribute and parameter information has been set: "resolution" has been set as "600 dpi"; "color mode" has been set as "color processing operation"; "sort of page description language" has been set as "PDL2"; and "transparent processing operation is optimized" has been set as "not optimized."

Next, the screen selecting module 12A acquires screen information based upon the attributes and the parameters managed by the screen parameter managing module 15A. In this concrete example, the screen selecting module 12A acquires such a parameter designated based upon the job control command managed by the screen parameter managing module 15A. In one concrete example represented in FIG. 3, the below-mentioned parameters are acquired, namely, "600 dpi", "color processing operation", "PDL2", and "transparent processing operation is not optimized" are acquired by the screen selecting module 12A.

The screen selecting module 12A selects such a screen which is used in response to the acquired screen information. In one concrete example shown in FIG. 3, the screen selecting module 12A selects "600 dpi, color text processing-purpose screen." In other words, the screen to be required corresponds only to "600 dpi, color text processing-purpose screen", since the screen selecting module 12A may understand from the acquired screen information such a fact that "PDL2" has only a command of a text, and moreover, the optimization of the transparent process operation is not carried out. The screen selecting module 12A transmits the information of this selected screen to the input data interpreting module 11A, and then, the transmitted screen data is expand-processed in the input data interpreting module 11A.

In the input data interpreting module 11A, the command of the page description language is processed while the expanded "600 dpi, color text processing-purpose screen" is employed, so that the page description language is expanded to bitmap data.

2. Second Exemplary Embodiment Mode (Arrangement of Image Processing Apparatus Related to Second Exemplary Embodiment Mode)

Figure 4:
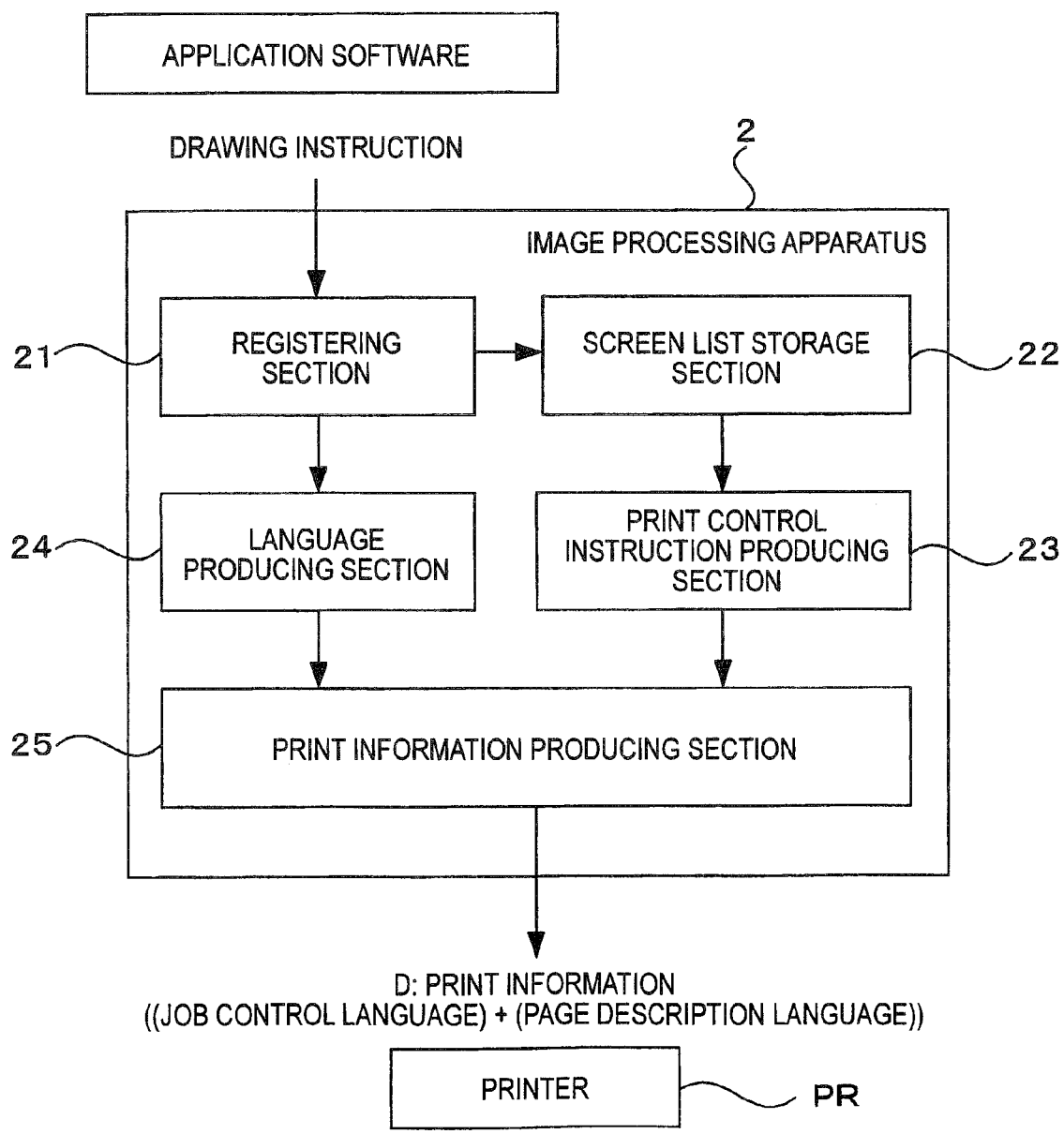
FIG. 4 is a block diagram for describing an arrangement of an image processing apparatus according to a second embodiment mode of the present invention.

FIG. 4 is a block diagram for describing an arrangement of an image processing apparatus according to a second exemplary embodiment mode of the present invention. The image processing apparatus 2 related to the second exemplary embodiment mode accepts a drawing instruction sent from application software, and produces print information, and then, outputs the produced print information to a printing apparatus "PR" such as a printer, a multi-function processing apparatus, and the like. The image processing apparatus 2 related to the second exemplary embodiment mode is arranged in, for instance, a printer driver of a client apparatus.

The image processing apparatus 2 related to the second exemplary embodiment mode is provided with registering section 21, screen list storage section 22, print control instruction producing section 23, language producing section 24, and print information producing section 25.

The registering section 21 performs such a processing operation that the registering section 21 interprets the drawing instruction sent from the application software, and registers a binary-processing screen into the screen list storage section 22 in response to a subject to be drawn.

The screen list storage section 22 corresponds to such a section for storing thereinto a list of binary-processing screens (namely, use screen list) which are used in response to an instruction of the registering section 21. Also, the screen list storage section 22 corresponds to such a section for storing thereinto a list of screens which are not used (namely, non-use screen list).

The print control instruction producing section 23 corresponds to a structural unit for producing an instruction of a job control language (namely, job control command) which is equivalent to a print control instruction. The print control instruction producing section 23 produces at least resolution, a present/absent situation of a monochromatic instruction, a sort of a page description language as an instruction of a print control (job control command). Further, in addition to producing of the job control command, the print control instruction producing section 23 performs such a processing operation that a binary-processing screen, which is required or not required in a drawing operation of a drawing instruction, is produced in response to a content registered in the registering section 21.

The language producing section 24 corresponds to a structural unit for producing an instruction (command) of a page description language based upon a drawing instruction transmitted from the application software.

The print information producing section 25 performs such a processing operation that the print control instruction (job control command) produced by the print control instruction producing section 23 is combined with the command group of the page description language produced by the language producing section 24 so as to produce print information "D", and then, the produced print information "D" is outputted to such a printing apparatus "PR" as a printer, a multi-function processing apparatus, or the like.

The image processing apparatus 2 according to the second exemplary embodiment mode has the below-mentioned feature: That is, when a decomposer, which is applied to the printing apparatus "PR" such as the printer, the multi-function processing apparatus, or the like, interprets the print information "D", the decomposer gives such a print control instruction (job control command) which is required in order to select a binary-processing screen, or binary-processing screens.

More specifically, the print control instruction producing section 23 produces at least resolution, a present/absent situation of a monochromatic instruction, and a sort of a page description language as the print control instruction (job control command). Also, in addition to the above-described processing operation, the print control instruction producing section 23 performs another processing operation that the present/absent situation of the transparent process operation, and the sort of such an application software for outputting the drawing instruction are added to the print control instruction (job control command).

In the printer, the multi-function processing apparatus, or the like, which corresponds to the printing apparatus "PR", the print information "D" outputted from the image processing apparatus 2 of the second exemplary embodiment mode is received, the received print information "D" is interpreted by the decomposer constructed inside the printing apparatus "PR", and then, the decomposer selects a binary-processing screen in response to a parameter of a job control command. The process operation for selecting the binary-processing screen corresponds to the above-explained selecting process operation executed in the image processing apparatus 1 of the first exemplary embodiment mode.

Concretely speaking, the image processing apparatus 2 according to the second exemplary embodiment mode defines such a job control command which has a priority in the job control language designated in the above-explained image processing apparatus 1 according to the first exemplary embodiment mode.

In this example, in a printer driver (printer driving software) in which the image processing apparatus 2 according to the second exemplary embodiment mode is realized, a command of a page description language has been produced based upon a drawing instruction issued from an operating system (OS) of a client apparatus (personal computer etc.) "CL". As a consequence, the printer driver has already recognized a sort of a drawing command. The above-described recognition as to the sort of drawing command is utilized as the information for delimiting the screen.

In other words, the printer driver verifies commands while the printer driver produces a page based upon the drawing instruction, and thus, the printer driver produces a list of screens to be used by checking whether or not a graphics command, a text command, an image command, and a command of a transparent processing operation are issued.

At this time, the produced commands of the page description language are once stored in the storage section. Then, after all of pages have been produced, the printer driver designates a list of the necessary screens as a head job control language based upon a command, and thereafter, sends an instruction group of the page description language which has been temporarily stored to the printing apparatus "PR."

3. Image Processing Program

Next, a description is made of an image processing program according to another exemplary embodiment mode of the present invention. The image processing program related to the present exemplary embodiment mode has steps which are executed by a computer. The computer is equipped with an operating unit for executing the image processing program related to the present exemplary embodiment mode, a storage unit for storing thereinto a program and various sorts of data, and an input/output unit. The above-described computer may be realized by an electronic computer such as a personal computer, and furthermore, may be alternatively realized by an electronic processor which has been assembled in an electronic appliance capable of handling information, for instance, a picture recording/reproducing apparatus, a portable terminal, and the like. Also, the image processing program of the present exemplary embodiment mode may be realized by such a program recorded on a recording medium such as a CD-ROM, or may be alternatively realized by a program which is distributed via a network.

(Hardware Structure)

Figure 5:
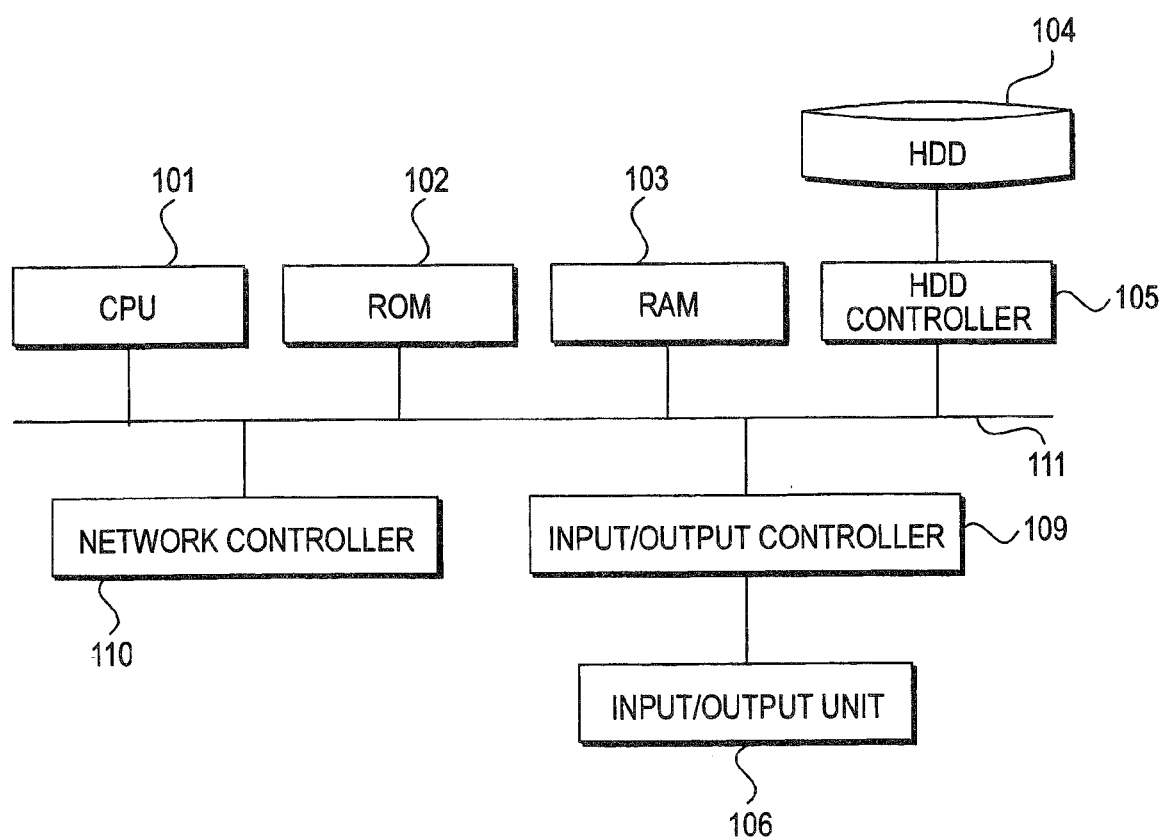
FIG. 5 is a block diagram for schematically showing a hardware structure of a computer which executes an image processing program.

FIG. 5 is a block diagram for schematically representing a hardware structure of a computer which executes the image processing program. As the hardware structure of the computer, the computer hardware is constructed in such a manner that a CPU (Central Processing Unit) 101, a ROM (Read-Only Memory) 102, a RAM (Random Access Memory) 103, an HDD (Hard Disk Drive) 104, an HDD controller 105, an input/output unit 106, an input/output controller 109, and a network controller 110 have been connected to each other via a bus 111.

An image processing program (will be discussed later) of the present exemplary embodiment mode has been stored in the HDD 104 employed in the above-described hardware structure, and is read in the RAM 103 in order to be executed, and then, the read image processing program is executed by the CPU 101.

Image Processing Program Corresponding to First Exemplary Embodiment Mode

Figure 6:
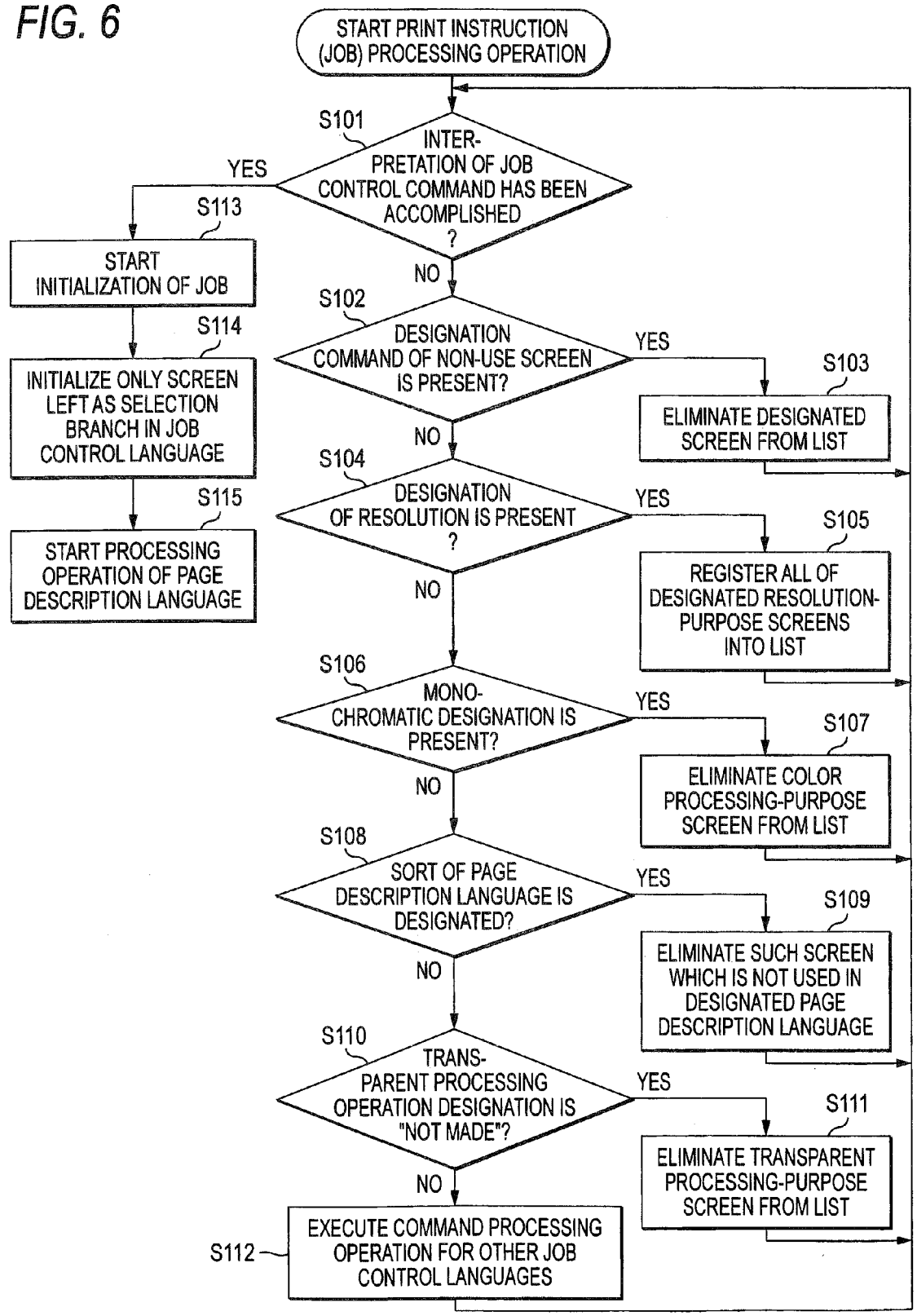
FIG. 6 is a flow chart for describing an image processing program which is executed by the computer of the image processing apparatus according to the first embodiment mode.

FIG. 6 is a flow chart for describing an image processing program which is executed by the computer of the image processing apparatus according to the first exemplary embodiment mode. In other words, this image processing program corresponds to a drawing process operation which is executed by a printing apparatus such as a printer, a multi-function processing apparatus, or the like.

When the computer of the image processing apparatus commences a processing operation of a print instruction (job), the computer firstly judges whether or not interpretation of a job control command has been accomplished (step S101). In the case that the interpretation of the job control command has not yet been accomplished, the drawing process operation is advanced to a step S102. To the contrary, when the interpretation of the job control command has been accomplished, the drawing process operation is advanced to a step S113. It should be noted that process operations defined after the step S113 will be discussed later.

When the job control command is interpreted, the computer firstly judges whether or not a non-use screen designation command is present (step S102). When the non-use screen designation command is present, the computer performs such a processing operation that the designated screen is eliminated from the screen list (step S103).

Next, when the job control command is interpreted, the computer judges whether or not resolution has been designated (step S104). In such a case that the resolution has been designated, the computer selects all of screens which correspond to the designated resolution and then, adds the selected screens to the screen list (step S105).

Next, when the job control command is interpreted, the computer judges whether or not a designation of a color processing operation corresponds to a description of monochrome (step S106) In such a case that the monochrome has been designated, the computer performs such a processing operation that the color processing-purpose screen is eliminated from the screen list (step S107).

Next, when the job control command is interpreted, the computer judges whether or not a sort of a page description language has been designated (step S108). In such a case that the sort of page description language has been designated, the computer performs such a processing operation that a screen which is not used in this designated page description language is eliminated from the screen list (step S109).

Next, when the job control command is interpreted, the computer judges whether or not an optimization of a transparent processing operation has been set as "not executed" (step S110). In such a case that the optimization of the transparent processing operation has been set as "not executed", the computer performs such a process operation that the transparent processing-purpose screen is eliminated from the screen list (step S11).

Next, the computer executes processing operations as to commands of the job control language except for the above-described commands (step S112).

Next, a description of processing operations in the case that the interpretation of the job control command is accomplished in the step S101. When the interpretation of the job control command is accomplished, the computer commences an initialization of a job (step S113). When the job is initialized, the computer executes such an initializing operation that only screens left as selection branches in the interpretation of the job control command are expanded (step S114). In this case, the screens registered in the screen list are expanded.

Then, the computer performs a processing operation of the page description language by employing the expanded screen so as to expand the page description language to bitmap data (step S115).

Image Processing Program Corresponding to Second Exemplary Embodiment Mode

Figure 7:
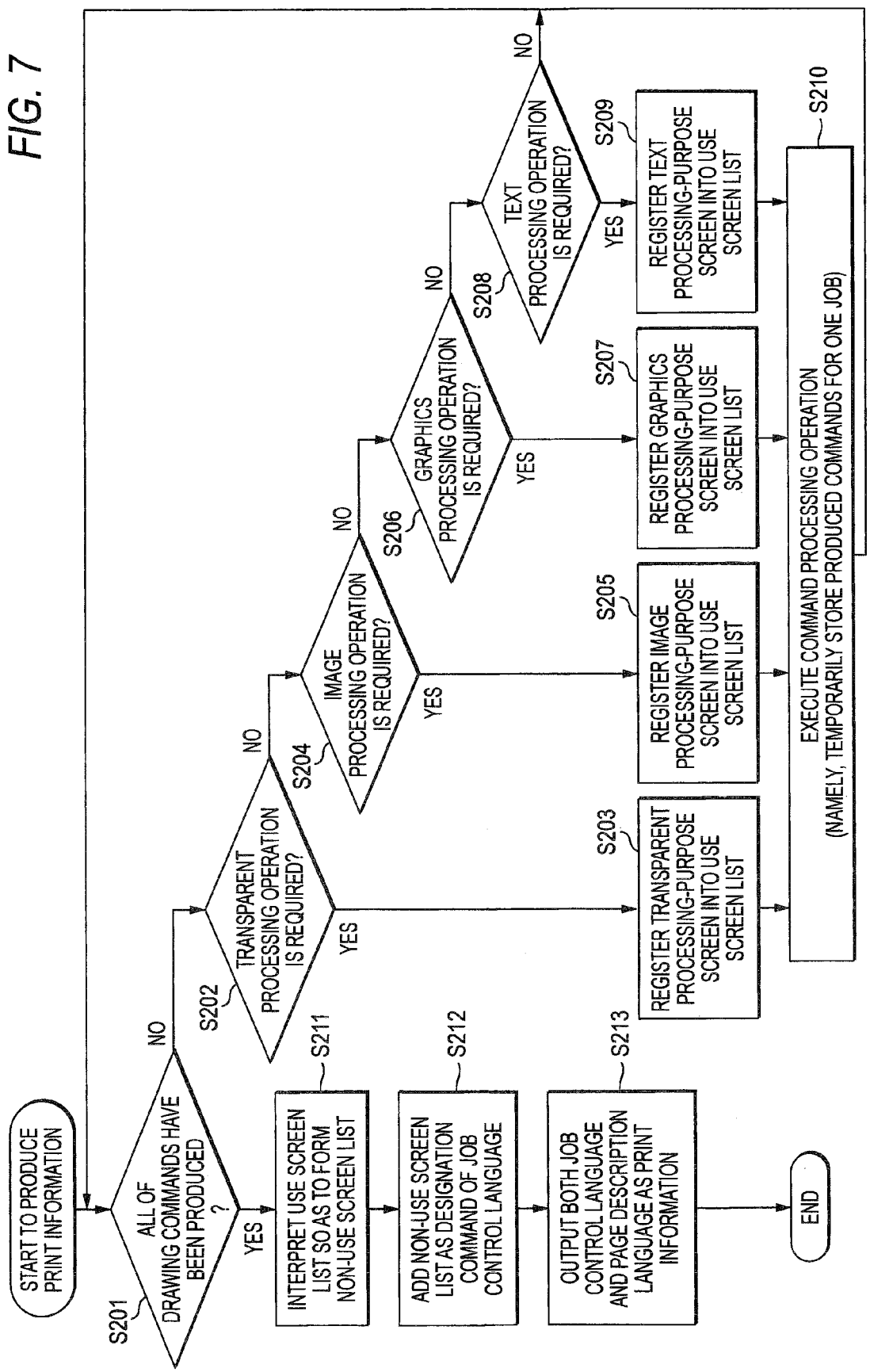
FIG. 7 is a flow chart for describing an image processing program which is executed by the computer of the image processing apparatus according to the second embodiment mode.

FIG. 7 is a flow chart for describing an image processing program which is executed by the computer of the image processing apparatus according to the second exemplary embodiment mode. In other words, this image processing program corresponds to a processing operation for producing print information which is executed by a client apparatus.

When the computer of the image processing apparatus commences a processing operation of print information, the computer firstly judges whether or not producing operations for producing all of drawing commands (namely, instructions of page description language) with respect to a print subject have been accomplished (step S201). In such a case that the producing operations for all of the drawing commands have not yet been accomplished, the producing operation is advanced to a step S202. In such a case that the producing operations for all of the drawing commands have already been accomplished, the producing operation is advanced to a step S211. It should be understood that producing operations defined after the step S211 will be discussed later.

When the drawing command is produced, the computer firstly judges whether or not a transparent processing operation is required (step S202). In such a case that the transparent processing operation is required, the computer registers a transparent processing-purpose screen into a list of screens which are used (namely, use screen list) (step S203). Then, the computer executes a command processing operation with respect to the transparent processing operation (namely, processing operation for producing drawing command of page description language) (step S210). The produced instructions (drawing commands) of the page description language for 1 job are temporarily stored.

In such a case that the transparent processing operation is not required, the computer judges whether or not an image processing operation is required (step S204). In such a case that the image processing operation is required, the computer registers an image processing-purpose screen in the use screen list (step S205). Then, the computer performs a command processing operation with respect to the image processing operation (step S210). The produced instructions (drawing commands) of the page description language for 1 job are temporarily stored.

In such a case that the image processing operation is not required, the computer judges whether or not a graphics processing operation is required (step S206). In the case that the graphics process operation is required, the computer registers a graphics processing-purpose screen into the use screen list (step S207). Then, the computer performs a command processing operation with respect to the graphics processing operation (step S210). The produced instructions (drawing commands) of the page description language for 1 job are temporarily stored.

In such a case that the graphics processing operation is not required, the computer judges whether or not a text processing operation is required (step S208). In the case that the text processing operation is required, the computer registers a text processing-purpose screen into the use screen list (step S209). Then, the computer performs a command processing operation with respect to the text processing operation (step S210). The produced instructions (drawing commands) of the page description language for 1 job are temporarily stored.

Next, a description is made of processing operations in the case that the productions of all of the drawing commands with respect to the printing subject are accomplished. When the productions of all of the drawing commands are accomplished, the computer interprets the use screen list so as to form a list of screens which are not used (namely, a list of non-use screen) (step S211).

Next, the computer performs such a processing operation that the non-use screen list formed in the step S211 is added to a head of the instruction group (namely, drawing command group) of the page description language produced in the step S210 as a designation command of the job control language (step S212). The designation command for the added non-use screen list is utilized as follows: That is, this designation command is interpreted with a higher priority, as compared with the interpretations of other job control commands in the step S102 (refer to FIG. 6) in the image processing program of the first exemplary embodiment mode.

Thereafter, the computer transmits the instruction group (drawing command group) of the page description language for 1 job which has been temporarily stored in the command processing operation of the step S210, and the job control language added to this instruction group to a printing apparatus (step S213).

4. Printing Apparatus

A printing apparatus according to an exemplary embodiment mode of the present invention corresponds to an apparatus equipped with printing section which prints information on a medium, which is known as a printer, a copying machine, and a multi-function processing apparatus. The printing apparatus according to the present exemplary embodiment mode is provided with the above-described printing section, and the structure of the image processing apparatus 1, or 2 according to the above-described first and second exemplary embodiment modes. In this printing apparatus, information binary-processed by the image processing apparatus 1, or 2 is printed on such a medium as paper by the printing section, and then, the printed information is outputted.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing apparatus comprising:
an interpreting section that interprets instructions of a print control contained in print information, the instructions including a resolution instruction, a monochrome designation instruction indicating whether a monochrome designation is applied, and a page description language designation instruction;
a selecting section that selects a binary-processing threshold matrix in response to at least the resolution instruction, the monochrome designation instruction, and the page description language designation instruction by any of ways including selecting and eliminating; and
a binary-processing section that binary-processes a page description language contained in the print information by employing the binary-processing threshold matrix selected by the selecting section.

2. The image processing apparatus according to claim 1, wherein the selecting section selects the binary-processing threshold matrix in response to the resolution instruction, the monochrome designation instruction, the page description language designation instruction, and a transparent processing instruction indicating whether a transparent processing operation is applied, the transparent processing instruction included in the interpreted instructions.

3. The image processing apparatus according to claim 1, wherein the selecting section selects the binary-processing threshold matrix in response to the resolution instruction, the monochrome designation instruction, the designation page description language instruction, and an application software instruction indicating a sort of an application software that forms the print information, the application software instruction included in the interpreted instructions.

4. An image processing apparatus comprising:
a registering section that interprets a drawing instruction so as to register binary-processing threshold matrices in response to a subject to be drawn;
a print control instruction producing section that produces print control instructions, the print control instructions including a resolution instruction, a monochrome designation instruction indicating whether a monochrome designation is applied, and a page description language designation instruction, and that produces binary-processing threshold matrices in response to the registered binary-processing threshold matrices, the binary-processing threshold matrices produced by the print control instruction producing section including any of a binary-processing threshold matrices required and a binary-processing threshold matrices not required in a drawing operation by the drawing instruction;
a language producing section that produces instructions of a page description language based on the drawing instruction; and
a print information producing section that adds the print control instructions to the instructions of the page description language so as to produce print information.

5. The image processing apparatus according to claim 4, wherein the print control instructions further include an instruction indicating whether a transparent processing operation is applied.

6. The image processing apparatus according to claim 4, wherein the print control instructions further include an instruction indicating a sort of application software issuing the drawing instruction.

7. A non-transitory computer readable medium storing a program causing a computer to execute a process for processing an image, the process comprising:
interpreting instructions of a print control contained in print information, the instructions including a resolution instruction, a monochrome designation instruction indicating whether a monochrome designation is applied, and a page description language designation instruction;
selecting a binary-processing threshold matrix in response to at least the resolution instruction, the monochrome designation instruction, and the page description language designation instruction by any of ways including selecting and eliminating; and
binary-processing a page description language contained in the print information by employing the selected binary-processing threshold matrix.

8. A non-transitory computer readable medium storing a program causing a computer to execute a process for processing an image, the process comprising:
interpreting a drawing instruction;
registering binary-processing threshold matrices in response to a subject to be drawn;
producing print control instructions, the print control instructions including a resolution instruction, a monochrome designation instruction indicating whether a monochrome designation is applied, and a page description language designation instruction;
producing binary-processing threshold matrices in response to the binary-processing threshold matrices registered, the produced binary-processing threshold matrices including any of binary-processing threshold matrices required and binary-processing threshold matrices not required in a drawing operation by the drawing instruction;

producing instructions of a page description language based on the drawing instruction; and adding the print control instructions to the instructions of the page description language so as to produce print information.

9. A printing apparatus comprising:

an interpreting section that interprets instructions of a print control contained in print information, the instructions including a resolution instruction, a monochrome designation instruction indicating whether a monochrome designation is applied, and a page description language designation instruction;

a selecting section that selects a binary-processing threshold matrix in response to at least the resolution instruction, the monochrome designation instruction, and the page description language designation instruction by any of ways including selecting and eliminating;

a binary-processing section that binary-processes a page description language contained in the print information by employing the binary-processing threshold matrix selected by the selecting section; and a printing section that prints information binary-processed by the binary-processing section on a medium.

* * * * *